H. MUELLER.
PIPE COUPLING.
APPLICATION FILED SEPT. 3, 1908.
934,687.
Patented Sept. 21, 1909.
2 SHEETS—SHEET 1.
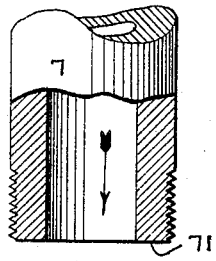
Fig. 1.
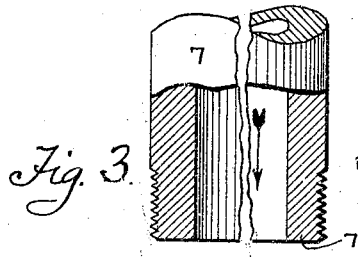
Fig. 3.  Fig. 3.ª
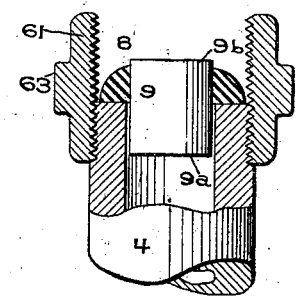
Fig. 2.  Fig. 2.ª
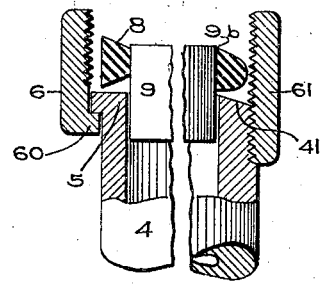
Fig. 4.  Fig. 4.ª
Witnesses
Inventor
Henry Mueller.
by John L. Waddell
Attorney.

H. MUELLER.
PIPE COUPLING.
APPLICATION FILED SEPT. 3, 1908.
934,687.
Patented Sept. 21, 1909.
2 SHEETS—SHEET 2.
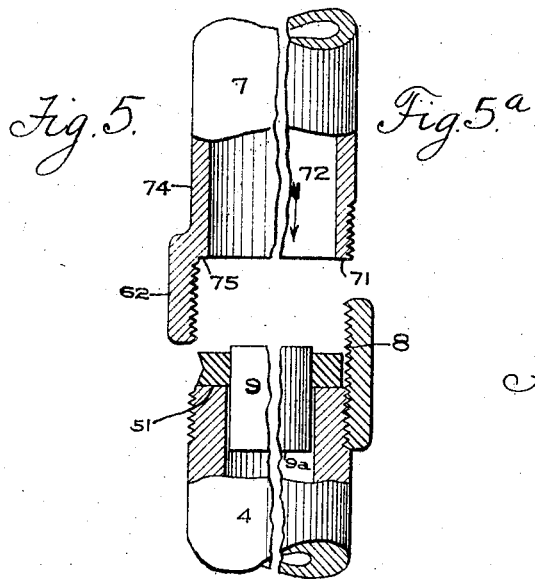
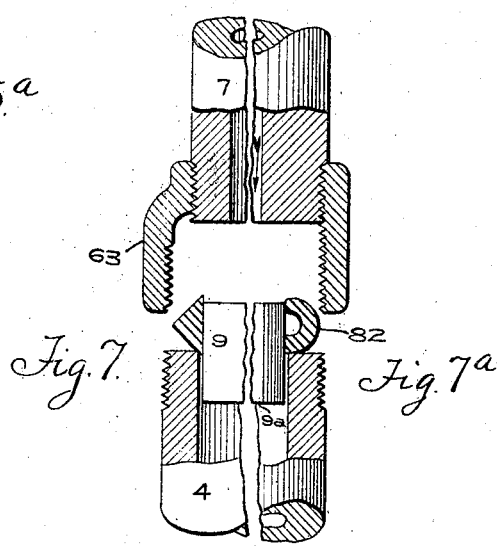
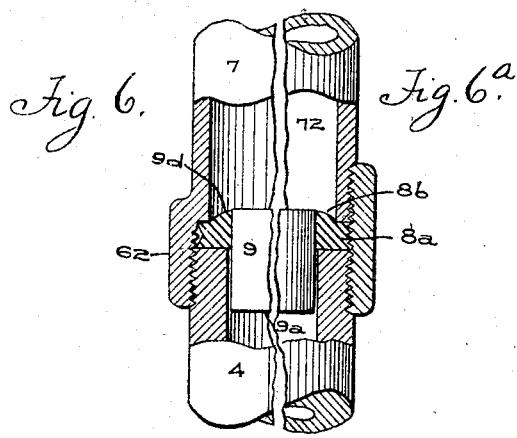
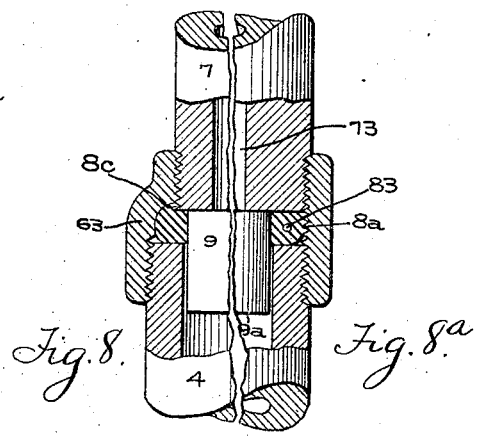
Witnesses
Inventor
Henry Mueller
by John L. Waddell
Attorney.

UNITED STATES PATENT OFFICE.

HENRY MUELLER, OF DECATUR, ILLINOIS, ASSIGNOR TO H. MUELLER MANUFACTURING COMPANY, OF DECATUR, ILLINOIS, A CORPORATION OF ILLINOIS.

PIPE-COUPLING.

934,687.　　　　　Specification of Letters Patent.　Patented Sept. 21, 1909.

Application filed September 3, 1908. Serial No. 451,544.

*To all whom it may concern:*

Be it known that I, HENRY MUELLER, a citizen of the United States, and a resident of Decatur, Macon county, State of Illinois, have invented certain new and useful Improvements in Pipe-Couplings; and my preferred manner of carrying out the invention is set forth in the following full, clear, and exact description, terminating with claims particularly specifying the novelty.

This invention relates to water distribution, and more especially to detachable pipe couplings; and its object is to produce a pipe connection whereby the gasket between the connected members will be compressed both longitudinally and away from the axis in the act of making the coupling, but neither member nor the compressible portion of the gasket will be unduly distorted. This object is accomplished, broadly speaking, by the employment of two pipe sections or members whose extremities or adjacent shoulders are cut off flat, or may be slightly beveled outward but are not beveled inward, with which members I employ a gasket consisting of a thin but stiff sustaining ring adapted to enter the bore of one of said members and be frictionally held therein and a soft joint-ring surrounding the sustaining ring and held frictionally but slidably thereon in position where it will be compressed longitudinally when the members are approximated and its material distended radially outward. Several embodiments of this idea are illustrated in the accompanying drawings and set forth in the following specification, both detailing its use as between members of the same or of different exterior diameters, having bores of the same or of different sizes, and connected to or coupled with each other in a variety of ways; and I have also illustrated but not claimed in the present case some of the variations in the form and structure of the gasket which may be used with a pipe connection of this type.

In said drawings, all of which are sectional views, Figure 1 is the simplest and might be called the preferred embodiment of my invention, and it shows the two members slightly separated from each other and all parts of this pipe coupling as they appear immediately before the connection is made; Fig. 2 shows the same construction, the parts being in the position they occupy when the connection is nearly completed, and Fig. 2ª shows them in the position they occupy after the connection is made. In like manner Figs. 3 and 3ª show other forms of the members, the coupling, and the joint ring, before and Figs. 4 and 4ª after the connection is made—the bores of the members in the views on Sheet 1 being of the same size; Figs. 5 and 5ª show different constructions of parts, in the positions they occupy before and Figs. 6 and 6ª after the connection is made—the bore of the upper member being larger than that of the lower; and Figs. 7 and 7ª show yet different constructions of parts, in the positions they occupy before and Figs. 8 and 8ª after the connection is made—the bore of the upper member being smaller than that of the lower. Slight differences appear in the contiguous views of all but Fig. 1 for the purpose of amplifying the illustration without multiplying the number of figures in the drawings.

Broadly speaking, the numerals 4 and 7 are used hereinafter to designate the members which are to be connected, 6 is the coupling, and 8 is the soft joint-ring and 9 the sustaining ring which together constitute the gasket; and these numerals with modifications are applied to like parts throughout all the figures of the drawings.

In Figs. 1, 2, and 2ª the members 4 and 7 are of equal external diameter and have bores of the same size, and both are cut off flat at their extremities. One means for approximating the members as here shown consists in threading them externally near their ends (either both right hand threads, or one right and one left) and using a coupling 6¹ which may have an angular wrench hold 6³. The form of gasket here shown consists of a joint-ring 8 of lead or some other easily compressible metal having its exterior made initially substantially conical and a cylindrical bore, the latter surrounding a sustaining ring 9 of brass or some other stiff and thin metal sufficiently strong to withstand inward pressure which might crush it and sufficiently long to provide an extension 9ª that projects beyond one end of the joint-ring as shown. The other end of the sustaining ring is set either flush with the corresponding end of the joint-ring or projects slightly beyond it as shown at 9ᵇ, but in any event it is substantially flush therewith and preferably the smaller end of the joint ring is disposed in that direction. The latter is mounted upon the sustaining ring by any approved means which holds it frictionally thereon with sufficient force to prevent its dislodgment or displacement under ordinary handling but yet sufficiently loose to permit it to slide upon the sustaining ring, and by preference the degree of friction between these parts is about the same as that between the extension 9ᵃ of the sustaining ring and the bore of that member which it enters. As the member 7 is moved in the direction of the arrow its flat end strikes the outer end of the joint-ring and compresses the latter axially and longitudinally—first stripping it slightly from and moving it backward upon the supporting ring as shown at 9ᶜ in Fig. 2; and as the parts assume their final position the joint-ring may be stripped further from the sustaining ring as shown at 9ᵈ in Fig. 2ᵃ, or the sustaining ring may be slid farther into the member 4 as will be understood, or both—the main idea being that the frictional engagement of the joint-ring upon its sustaining ring and of the extension of the latter within the bore of one of the members is such as to permit the proper movement of the parts of the gasket on each other or of the gasket in the members as the latter are approximated. During this operation the flattened ends of the members engage the opposite ends of the joint-ring 8, and whatever the shape of the latter it will be compressed axially between them and therefore enlarged radially in size. Meanwhile the sustaining ring serves the purposes of resisting the expansion of the joint-ring radially inward toward the axis, and hence it can expand only in a radial direction outward toward the coupling whatever the form of the latter.

It will be noted that the general features of construction and operation as just described are substantially the same throughout the other views of the drawings.

In Figs. 3 to 4ᵃ the bores of the members 4 and 7 are the same, in Figs. 3ᵃ and 4ᵃ their exterior diameters are the same and an ordinary coupling 61 is employed, and in Figs. 3 and 4 their exterior diameters differ and a coupling nut 6 is employed which is threaded onto one member and has at its outer end an interior shoulder 60 engaging an exterior flange 5 on the other member. As seen in Fig. 3ᵃ, the ends of the members may be cut off square as at 71, or could be beveled outward as at 41. The joint-ring may be initially of different cross section from that shown in Fig. 1, but as illustrated in Fig. 4 in its final shape it will practically fill the space around the sustaining ring, between the meetings ends of the members, and within the coupling or nut—having been expanded or distended radially outward by the approximation of the members as above described.

In Figs. 5 to 6ᵃ the bore 72 of the member 7 is larger than that of the member 4, while their exterior diameters differ in Figs. 5 and 6 and are the same in Figs. 5ᵃ and 6ᵃ as above described. In Fig. 5 the coupling is replaced by the bell end 62 of the pipe section 74, but within said bell at the extremity of the member proper there must be a shoulder 75 which should be flat like the end 71 of the member 7 or might be beveled outward as shown at 52 Fig. 4ᵃ. I prefer to use a coupling sleeve or nut, however, as in Figs. 5ᵃ and 6ᵃ, because if the coupling be integral with one of the members it must be rotated to make the connection and its shoulder will therefore grind upon the joint-ring. When the bore of one of the members is larger as shown in these views, their approximation may distort the joint-ring slightly as at 8ᵇ, Fig. 6ᵃ, although in its final shape it will fill the space between the extremities and be expanded or distended radially outward as at 8ᵃ. An enlarged bore in one member will also prevent the extension 9ᵃ from being frictionally inserted therein by hand, and will permit the joint-ring to be stripped from the other end of the sustaining ring as at 9ᵈ because the friction between its extension and member 4 will probably cause the sustaining ring to slide through the joint-ring in the act of making the connection.

In Figs. 7 and 8 the bore 73 of the member 7 is smaller than that of the member 4, while their exterior diameters differ in Figs. 7 and 8 and are the same in Figs. 7ᵃ and 8ᵃ as above described, and a reducing coupling 63 is illustrated for use where their exterior diameters differ. When the bore of one of the members is smaller as shown in these views, their approximation will neither distort the joint-ring nor strip it from the adjacent end of its sustaining ring, although the latter will be slid through the joint-ring because it is pushed by the end of the member having the smaller bore. In its final shape the joint-ring will fill the space between the extremities and be expanded or distended radially outward as at 8ᵃ in Fig. 8ᵃ. A reduced bore in the member 7 will also prevent the extension 9ᵃ from being inserted in this member by hand, although it may yet be fitted to the other member as will be clear. If the wall of the smaller member is thin enough, the material of the joint-ring may be forced over its outer corner slightly as shown at 8ᶜ, Fig. 8, but I do not consider this objectionable. Figs. 5 to 8ᵃ show joint rings of various cross sections adapted for use in this pipe connection, and in Figs. 7ᵃ and 8ᵃ the ring 82 is shown hollow, with its cavity 83 partially closed in the completed coupling.

Whatever the details of construction of parts, it is essential to the present invention that the joint-ring be mounted frictionally but yet slidably upon the sustaining ring and preferably near one end of the latter (and substantially flush therewith) so as to leave an extension 9ᵃ at its other end which is adapted to be manually inserted and frictionally held within the bore of one of the members. The drawings show this extension as initially inserted in the lowermost in each of the two members which would probably be the case where the pipes stand in a vertical position, although elsewhere or even in that case the frictional contact is intended to be such as to hold the gasket against accidental dislodgment even if inserted in the uppermost, so that the hands of the operator are left free to bring the other member and the coupling into position and properly manipulate the parts. It will be seen that this connection increases the facility of manipulation, is adapted for use with members of different bores and with or without a flange, and may be employed with couplings of a variety of shapes. It is important to note, also, that while the exterior of the joint-ring is preferably tapered or conical, such shape is not at all necessary when the extremities of the coupling members are flat, because it is the presence of the sustaining ring and the approximation of said extremities which produces the longitudinal compression of the joint-ring and its distention radially outward to or toward the coupling.

In another application filed by me and bearing Serial Number 451,856 I illustrate and describe variations in the form of parts of this pipe connection whereby the compression of the joint-ring is longitudinal and radially inward instead of outward; and in yet another application filed September 10, 1908, and bearing Serial Number 452,448 I illustrate and describe variations in the form and structure of a gasket embodying these general ideas but adapted for use with pipe sections or members having meeting extremities of a variety of shapes and sizes, whereby each gasket is intended to fit them all.

What is claimed as new is:

1. A pipe connection comprising a tubular member whose bore is cylindric at its end, a second tubular member, external means for approximating them, a yielding joint-ring interposed and adapted to be compressed between their extremities, and a stiff sustaining ring fitting slidably within the joint-ring and extending from a point substantially flush with one end of said joint-ring throughout the body thereof and having an extension beyond the other end of said joint-ring adapted to be manually inserted and slidably and frictionally held within said cylindric bore.

2. A pipe connection comprising two tubular members having cylindric bores of different sizes, external means for approximating them, a yielding joint-ring interposed and adapted to be compressed between their extremities, and a stiff sustaining ring fitting slidably within the joint-ring and having an extension beyond one end thereof fitting frictionally within the bore of one of said members.

3. A pipe connection comprising two tubular members having cylindric bores of different sizes and flat extremities, external means for approximating them, a yielding joint-ring interposed and adapted to be compressed between their extremities, and a stiff sustaining ring fitting within the joint-ring and having an extension beyond one end only thereof fitting frictionally within the bore of one of said members and adapted to slide therein as the members are approximated.

4. A pipe connection comprising a tubular member whose bore is cylindrical at its end, a second member having a smaller bore, means for approximating them, a yielding joint-ring interposed between their extremities, and a stiff sustaining ring larger than said smaller bore engaging and carrying said joint-ring and having a longitudinal extension adapted to be manually inserted and slidably and frictionally held within said cylindric bore.

5. A pipe connection comprising a tubular member whose bore is cylindrical at its end, a second member having a smaller bore, means for approximating them, a yielding joint-ring interposed between their extremities, and a stiff sustaining ring larger than said smaller bore, fitting slidably within said joint-ring and having a longitudinal extension adapted to be manually inserted and slidably held within said cylindric bore.

6. A pipe connection comprising an externally threaded member having a flat extremity, a second member having an internally threaded integral bell end and within it a flat shoulder, a yielding joint-ring interposed and adapted to be compressed between said flat faces as the threads engage, and a stiff sustaining ring fitting within the joint-ring and preventing its collapse under pressure and having an extension beyond one end thereof fitting frictionally and slidably within the bore of one of said members.

In testimony whereof, I have hereunto subscribed my signature, this 22nd day of August, A. D. 1908.

HENRY MUELLER.

Witnesses:
E. BROWN,
JOHN L. WADDELL.